Figure 1:
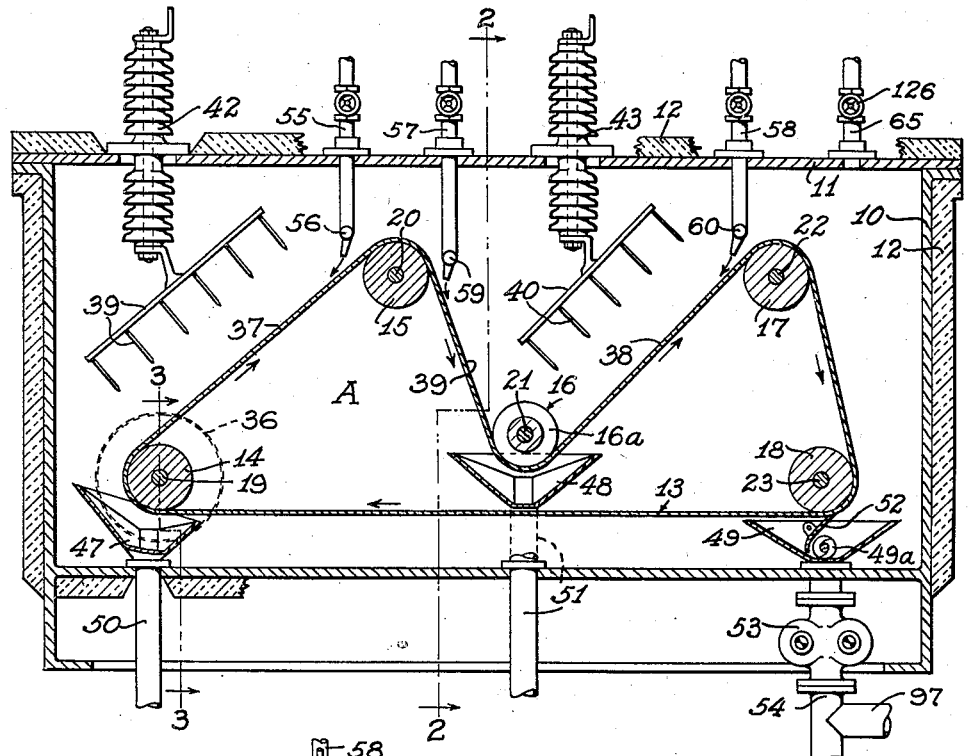

Feb. 22, 1938.    L. DILLON    2,109,350
PROCESS AND APPARATUS FOR DEWAXING OIL
Filed Aug. 3, 1936    2 Sheets-Sheet 1

INVENTOR.
Lyle Dillon
BY
Philip Subkow
ATTORNEY.

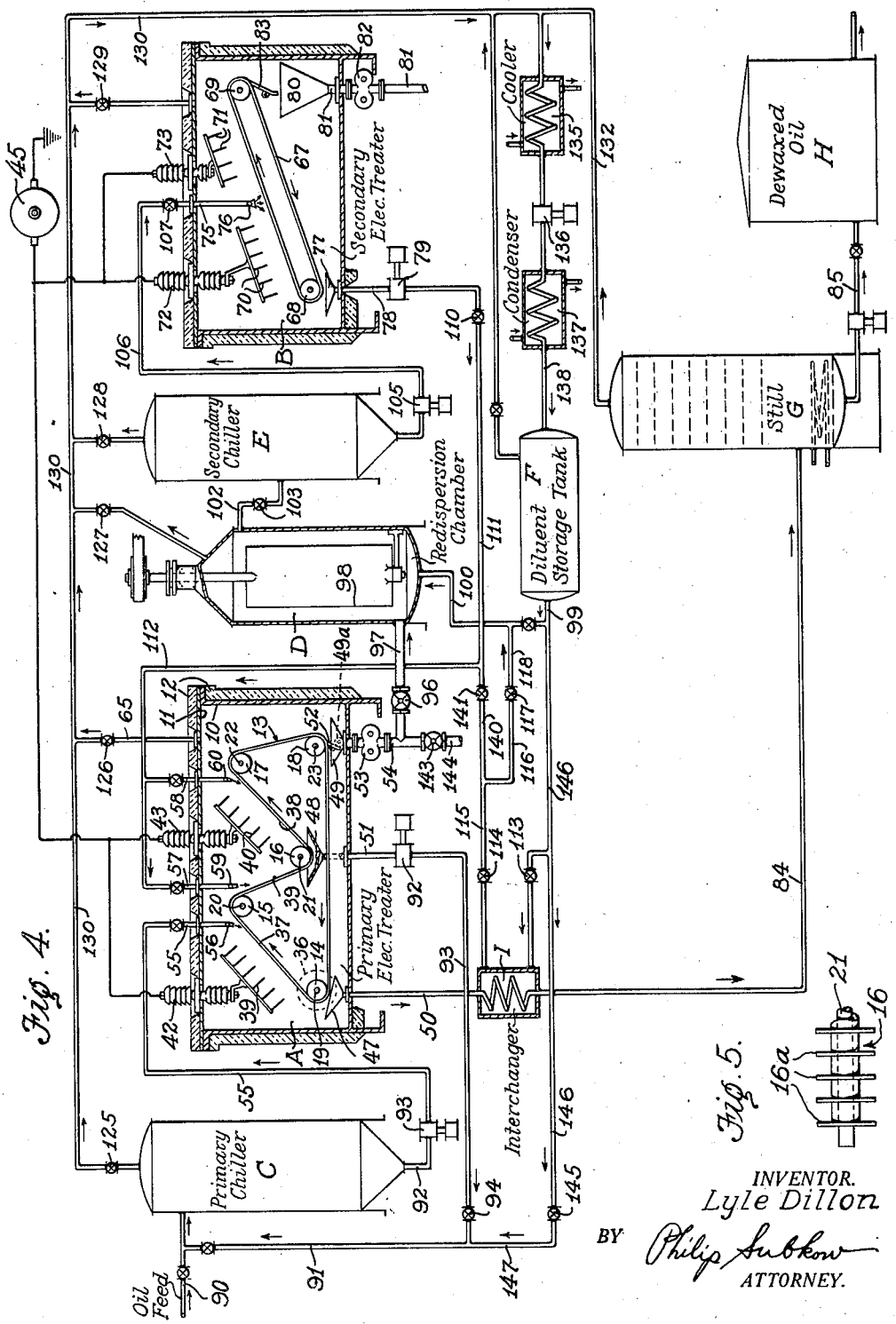

Patented Feb. 22, 1938

2,109,350

UNITED STATES PATENT OFFICE 2,109,350

PROCESS AND APPARATUS FOR DEWAXING OIL

Lyle Dillon, Los Angeles, Calif., assignor to Union Oil Company of California, Los Angeles, Calif., a corporation of California Application August 3, 1936, Serial No. 93,958

17 Claims. (Cl. 204—24)

This invention relates to the separation of precipitates from oils and particularly to the electrical separation of wax, asphalt, resin and the like substances from hydrocarbon oils.

Many oils, such as lubricating oil, fuel oil, motor fuel, and other similar oils which are derived from crude oils, contain paraffinic, waxy, asphaltic and resinous constituents, which may appear there by reason of having been present in the crude oil from which they were derived or by reason of their formation in intermediate treating processes such as distillation or cracking. The wax-like constituents which may thus be present limit the minimum temperature at which these oils can be used by solidifying or congealing at low temperatures. The asphaltic and resinous bodies also are objectionable for numerous other reasons well known in the art of lubricating oil and motor fuel refining. Therefore, in the refining of such oils, it is common practice to remove a substantial portion of these waxy, asphaltic and resinous constituents, in order to lower the pour points and improve the quality of such oils.

The separation of the undesirable paraffinic and waxy bodies from oil fractions has been accomplished in the past by several processes, the most common and oldest of which are the "cold settling process" and the "cold pressing process". These processes have been inefficient, time consuming and mechanically involved.

Asphaltic, resinous and tarry constituents and color bodies have been separated by well known processes employing acid, alkali, clay or other chemical treatment and recently by solvents. In the solvent process the oil containing the undesirable constituents such as asphalt, resin, color bodies and the like, is dissolved in a quantity of a suitable diluent such as liquid propane or other liquid normally gaseous hydrocarbon which has preferably, at normal temperature, low solvent power for these bodies, while at the same time retaining practically complete solvent power for the desirable fractions of the oil. Such solvent treatment results in the rejection of asphaltic bodies from the oil-diluent solution in the form of a relatively heavy insoluble precipitate or as a heavy liquid phase, a substantial portion of which may be separated from the oil solution by settling in a reasonable length of time. In this solvent process, however, a sufficient quantity of the precipitate material often remains in the oil solution in the form of an unsettled finely divided suspension to cause serious contamination of the final product unless special steps are taken for its complete removal.

Objects of this invention, therefore, are to overcome the disadvantages of the heretofore employed processes for the separation of wax, paraffin, asphaltic, tarry, resinous and color bodies from oils and to provide an improved process for the separation of these substances from oil which will be efficient, economical, of high capacity and rapid in action, and less costly in time and equipment than these processes heretofore employed. Another object of this invention is to provide a method wherein wax will be separated from wax-bearing oil which has been quickly cooled or "shock chilled", obviating batch chilling methods. Another object of this invention is to provide a process for separating wax from wax-bearing oil wherein an improved recovery of oil is accomplished resulting in the separation of wax having a lower oil content and a higher melting point than heretofore possible with cold settling and cold pressing methods. Another object of the invention is to provide a method and apparatus for the separation of a low oil content high melting point wax from wax-bearing oil with economic utilization of a minimum of diluent or solvent. Other objects of the invention are to provide an improved process and apparatus for the efficient electrical separation of asphalt, resin, tar, color bodies and the like from oils.

In general, these objects are obtained according to the invention by subjecting the oil containing the suspended precipitate bodies to the action of an electric field.

Accordingly, the invention resides in an improved process and apparatus for the separation of suspended solids or precipitates from oils, wherein the oil containing the suspension is subjected to an intense ionizing electric field and the suspension separated from the oil by electrodeposition in a layer upon an electrode surface. The invention resides more specifically in a process and apparatus for the electrodeposition of the suspended precipitates from oils wherein the oil precipitate mixture is placed in the form of a layer upon an inclined moving belt electrode and subjected there to an intense ionizing electric field whereby the precipitate is deposited and held in a dense compacted layer upon the moving electrode surface, thus effecting the separation of the purified oil and the precipitate, and whereby the precipitated layer thus separated from the oil may be washed and further electrically treated to provide a dry, oil-free precipitate and a maximum recovery of purified oil. The invention also resides particularly in a process and apparatus whereby the wash liquid or oil diluent used for freeing the deposited wax of oil to obtain an oil-free high melting point electrically treated wax is in effect passed countercurrent throughout the process and finally commingled as the diluent with the waxy oil feed, thereby reducing the over all diluent-oil ratio and economizing in the quantity of diluent and refrigeration cost.

This process is particularly adapted and finds one of its major industrial applications to processes for the removal of wax from oil. It is a particular advantage of the process that, in contradistinction to processes of settling, centrifuging or filtering, a careful preparation of the wax, that is as to crystal structure or plasticity, is unnecessary. In fact, all that is required is to separate the wax as a solid phase by chilling or otherwise precipitating it by reducing the solubility of the wax in the solvent or oil. I have found that the process works particularly well with flash chilled waxes, i. e. those waxes formed by such rapid chilling that the wax is in very finely divided condition.

Other objects, advantages and novel features of the invention will be evident hereinafter.

Figure 2:
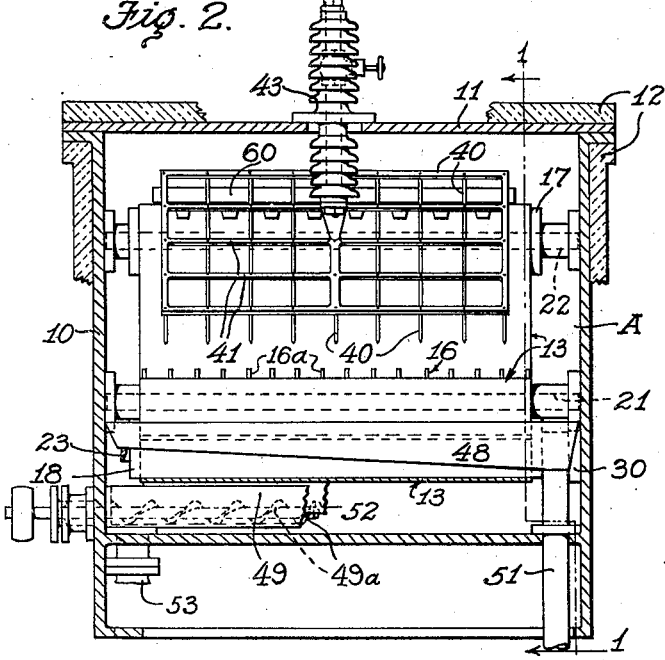
Figure 3:
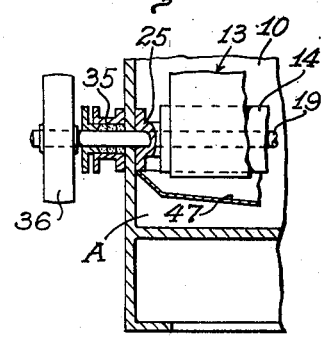

The accompanying drawings, of which Fig. 1 is a sectional elevation, Fig. 2 a cross section taken at line 2—2 and Fig. 3 a vertical cross-section taken at line 3—3 of Fig. 1, illustrate one embodiment of the primary electrical treating unit. Fig. 4 is a flow diagram and is illustrative of the general arrangement of the process and apparatus. Fig. 5 is a fragmentary detail of one of the positioning rollers.

The main elements of the apparatus are the primary electrical treater A, the secondary electrical treater B, the primary chiller C, the agitator redispersion chamber D, secondary chiller E, diluent storage tank F, dewaxed oil still G, and dewaxed oil storage tank H.

Referring to the primary electric treater A, 10 is a gas-tight enclosure, provided with a top 11, and a suitable surrounding heat insulated material 12. Inside of the container 10 is provided a movable belt metallic electrode 13, extending between the rotatable metal drums or rollers 14—18. These metal drums are rotatably supported upon shafts 19—23 respectively which extend into suitable bearings 25—30 supported by the treater side walls as illustrated in Fig. 2. The shaft from roller 19 extends through bearing 25 and through stuffing box 35 to the pulley 36 on the outside of the container 10 as shown in Fig. 3 to which power is applied and by which the belt is made to travel between the pulleys in the direction indicated by the arrows. Adjacent the belt surfaces 37 and 38 are supported banks of electrodes 39 and 40 respectively, each bank comprising a plurality of pointed electrodes, each directed substantially perpendicularly towards the said belt surface. The pointed electrodes are supported at uniform spacing from their upper ends upon a rectangular metallic gridwork 41 as illustrated in the sectional elevation Fig. 2. The two electrode banks 39 and 40 comprising the pointed electrodes, and the supporting spaced grids are in turn suitably supported by means of lead-in insulators 42 and 43 which pass through the treater top 11 and additionally serve to establish electrical connection to the outside high potential generator 45. In the lower portion of the electric treater container 10 are three funnels 47, 48 and 49, positioned directly underneath rollers 14, 16 and 18 and adapted to catch dewaxed oil run-off from the belt surface 37, wash oil run-off from belt surfaces 38 and 39, and wax, respectively. The dewaxed oil is removed from the funnel 47 and from the treater container 5 through pipe 50, the wash oil is removed from the funnel 48 and from the treater through pipe 51 and from the deoiled washed wax which is finally removed from the belt surface by means of the scraper 52 moved across the bottom surface of the funnel 49 by the wax screw 49a to the funnel outlet and finally is removed from the funnel 49 by means of the pump 53 through the pipe 54.

Pipe 55 leading to the nozzle manifold 56 is provided for distributing wax-bearing oil in a layer to the top of the upward moving sloping belt surface 37. Pipes 57 and 58 leading to nozzle manifolds 59 and 60 respectively are provided for subjecting deposited wax on the belt surfaces 38 and 39 to a forceful spray of wash oil. Pipe 65 and valve 126 are provided for venting gases from the treater unit and in the case of the embodiment of volatile diluents valve 126 serves to regulate temperatures within the treater by regulating the pressures therein.

The roller 16 may be constructed of a number of thin spaced discs 16a which will contact only a relatively small portion of the deposited wax area on the belt, as shown in Fig. 5.

The secondary electric treater B is constructed similar to the hereinbefore described primary electric treater A except that for purposes of illustration it is shown as comprising a single slope, single stage belt type electric treater. In the secondary electric treater B the belt 67 is supported and moves upon an inclined plane between rotatable drums 68 and 69. Pointed electrode banks 70 and 71 are supported through lead-in insulators 72 and 73 in a manner similar to that illustrated and hereinbefore described in connection with the primary treater. Pipe 75 leading to the nozzle manifold 76 is provided for placing the liquid to be electrically treated upon the upper surface of the belt electrode in a layer. Funnel 77 and pipe 78 are provided for collecting and withdrawing the electrically treated liquids dropping from the lower end of the belt electrode. Funnel 80 and pipe 81, and pump 82 are provided for collecting and removing the treated wax which is stripped from the belt surface by the scraper 83.

The herein described apparatus is adapted to perform the process of electrically separating precipitates and solids from oils in general. It is particularly adapted to separate wax, asphalt and color bodies from lubricating oils, waxy, resinous and colored bodies from gasoline and Diesel fuel oil, asphaltic and carbonaceous substances from residuums and tars from coal tar oils and the like. It is also adaptable to the separation of spermaceti, stearine, olein, palmitin, arachidin, elaidin and other high melting point fats and their acids from animal or vegetable oils containing them. These fats or fatty acids may be precipitated preparatory to the electrical separation by chilling and/or by means of diluents or antisolvents. Fatty oil to be freed from stearine, for example, such as cottonseed oil, is diluted with a light volatile hydrocarbon fraction and chilled either directly by evaporation of a portion of the diluent or directly by heat exchange with a suitable refrigerant to precipitate the stearine in the form of finely divided solid particles and the subsequent separation of the stearine and the thus treated cottonseed oil accomplished electrically according to the process described herein.

Since the process and operation of the apparatus for the separation of any one of these substances from oil is similar, the following typical operation as applied to the electrical dewaxing of wax-bearing oil, for example, is given.

The wax precipitate may be formed in the wax-bearing oil preparatory to the electrical dewaxing process either by chilling in the presence of a suitable diluent by indirect heat exchange with a suitable refrigerant or it may be formed by direct internal refrigeration in the presence of a liquid normally gaseous diluent such as propane. The wax precipitate is preferably formed by the latter refrigeration method wherein the wax-bearing oil liquid propane solution is continuously flashed into a region of low pressure accompanied by the rapid evaporation of a portion of the propane and the resultant sudden chilling and the precipitation of the wax in the remaining oil propane solution. Rapid chilling such as this is known as "flash" chilling or "shock" chilling and apparently results in the formation of a finer wax precipitate than is formed by slower cooling methods. The formation of such fine precipitates appears to be advantageous in the electrical dewaxing process. In the present process illustrated herein, the wax-bearing oil from feed line 90 meets and mixes with the diluent such as liquid propane from the line 91 and enters the primary chiller C where, at reduced pressure, and a resulting evaporation of a portion of the propane, the temperature is reduced sufficiently to precipitate wax in the oil-propane mixture. Sufficient propane is generally added at this point to form a solution having an effective propane-oil ratio after refrigeration of from two to six volumes of propane to one volume of oil. It is preferable to operate with an effective over all propane-oil ratio of approximately two and one-half to one. The propane oil mixture, generally at a ratio of approximately two and one-half to one, and at a temperature of approximately —35° F., containing the precipitated wax, is withdrawn from the bottom of the primary chiller C through line 92 and by means of pump 93 is forced through pipe 55 to the nozzle manifold 56 by means of which it is applied in a layer and runs down under the influence of gravity over the sloping metal belt electrode surface 37. The thus applied wax-bearing oil diluent layer is subjected to an intense ionizing electric field between the lower points of the pointed electrode and the upper belt surface, resulting in the electrodeposition of the wax in a dense coating upon the upward moving belt surface. The oil propane mixture thus relieved of the precipitated wax continues downward under the influence of gravity over the belt surface and drops therefrom at the underneath surface of roller 14 into the funnel 47 and is removed from the primary electric treater through pipe 50, heat exchanger I, pipe 84 to the still G where the propane is evaporated from the oil. The depropanized oil from still G is pumped through line 85 to the dewaxed oil storage tank H.

The electrically deposited wax layer continues with the movement of the belt over the roller 15 down the slope 39 under the roller 16 and onward up the slope 38. The said wax deposit layer on either or both of the belt slopes 39 or 38 may be subjected to forceful propane wash sprays from either or both of the nozzle manifolds 59 or 60 respectively.

It is, with some waxes, advantageous to subject the wax layer on the downward slope 39 of the belt electrode to washing, while free from the influence of an electric field. Under such condition the wash solvent is more free to penetrate the wax layer and to thus more effectively reach the occluded oil. Upon subsequently passing under the influence of the electric field on the upward sloping portion of the belt electrode 38, the thus applied solvent is withdrawn from the moving wax layer, carrying away with it the dissolved occluded oil. This process is of course augmented by additional wash spray from nozzle manifold 60 at the top of the slope 38. These wash solvent sprays are ordinarily precooled, as described hereinafter, to a temperature where no substantial solution of the wax on the electrodes being washed will occur. However, the temperature may be adjusted to cause partial solution if desired. The effect of the propane sprays is accordingly to thoroughly scrub the deposited wax layer and to remove a substantial portion of the included oil.

The wash propane oil mixture drains down the belt surfaces and is collected in the funnel 48 from which it is withdrawn through line 51. This wash propane containing the small amount of oil which it has removed in the wax scrubbing process, thus withdrawn through line 51, is forced by means of pump 92 through line 93, valve 94, and returns through the before mentioned propane diluent line 91 to mix with the wax-bearing oil feed entering the primary chiller C through line 90. The wash propane thus constitutes the before mentioned liquid propane diluent supplied to the wax-bearing oil feed.

The electrically deposited wax layer adhering to the belt surface 38 while undergoing the washing process is simultaneously subjected to an intense ionizing electric field between the pointed electrodes of the electrode bank 40 and the metal belt surface whereby it is freed under the combined scrubbing and the electric treating of included oil to produce a more oil-free high melting point wax. The wax layer thus treated passes with the movement of the belt over the metal drum 17 and downward under the metal drum 18 where the washed wax is removed by means of the scraper 52 which bears upon the moving belt surface. The wax thus removed from the metal belt surface by the scraper 52 drops into the funnel 49, and is expelled from the treater through pipe 54 by the pump 53 and may be forced through valve 96 into the redispersion chamber D. The redispersion chamber D is maintained substantially filled with liquid propane supplied from the propane storage tank F through lines 99 and 100. A stirrer 98 is provided in the chamber D for effecting a thorough redispersion of the wax in the liquid propane. The redispersed wax liquid propane mixture is next withdrawn from the dispersion chamber D through line 102, and valve 103 into the secondary chiller E where at reduced pressure a portion of the liquid propane is allowed to evaporate and to effect sufficient additional internal refrigeration to maintain the wax in precipitated form. The liquid propane wax mixture is then withdrawn from the secondary chiller E and by means of pump 105 is forced through line 106, valve 107 and through line 75 to the jet manifold 76 inside of the secondary electric treater. The liquid propane wax mixture is thus supplied to the upper sloping surface of the belt 67 in the secondary electric treater in the form of a layer which under the influence of gravity runs downward under the electrode bank 70. The liquid propane-wax mixture layer is subjected to an intense ionizing electric field between the points of the electrodes of the bank 70 and the metal belt surface which results in the electrodeposition of the wax in a dense coating upon the upward moving surface of the sloping belt electrode and in leaving the wax-free propane containing the remnant oil in solution removed from the wax coating to flow downward and drop into the funnel 77 and be withdrawn from the secondary electric treater through line 78 by means of pump 79 and returned through valve 110, pipes 111 and 112, to the two before mentioned propane wash inlet pipes 57 and 58. The thus returned dewaxed propane constitutes the before mentioned propane wash supply for the primary electric treater scrubbing stage. The deposited wax removed from the propane in the secondary electric treater continues upward upon the moving belt electrode surface and after being subjected to further electric treatment for further removal of solvent under the influence of an intense ionizing electric field between the electrode bank 71 and the belt electrode surface is removed by means of scraper 83 and allowed to drop into funnel 80 from which it is withdrawn through pipe 81 by means of pump 82. The wax thus removed from the secondary electric treater through pump 82 constitutes the finished relatively oil-free high melting point wax and may be delivered to storage through suitable means.

The propane introduced into the redispersion chamber D from the storage tank F through lines 99 and 100 is ordinarily maintained sufficiently warm as a result of the prior solvent recovery operations or other suitable means to effect resolution of the treated wax introduced through line 97. The resulting wax propane solution withdrawn through pipe 102 and valve pressure reduction 103 is thereafter sufficiently chilled by internal refrigeration at reduced pressure in the secondary chiller E to reprecipitate the wax. In this manner the maximum recovery of included oil from the wax by the propane solvent is effected. The redispersion chamber D under these conditions is maintained under sufficient pressure to prevent evaporation of the diluent therein. Ordinarily, however, it is sufficient to simply redisperse the precipitated wax removed from the primary electric treater in the liquid propane in the chamber D at a temperature sufficiently low to prevent resolution. In this case the agitation alone is sufficient to effect redispersion and efficient washing of the included oil from the wax. The liquid propane for this purpose may be withdrawn from the supply chamber F through lines 99, 146, valve 113, heat interchanger I, valve 114, lines 115, 116, valve 117 and lines 118, and 100 to the redispersion chamber D. The liquid propane in which the wax is to be dispersed is thus precooled by indirect heat exchange with the cold outflowing dewaxed oil from the primary electric treater. If the heat exchange in the interchanger I is insufficient to reduce the temperature of the liquid propane to a point where the wax will not redissolve, the liquid propane may be initially cooled by any other suitable means such as, for example, bleeding a small quantity of vapors from the storage chamber through valve 120 and line 121 to the low pressure propane vapor recovery system.

The temperature of the liquid propane in the redispersion chamber D can also be maintained at a sufficiently low value to prevent solution of the wax by reducing the pressure therein through valve 127 and allowing a small portion of the propane to evaporate.

The propane vapors from the primary chiller C, primary electric treater A, redispersion chamber E, secondary chiller D and secondary electric treater B are discharged through the valves 125–129 respectively into the collecting line 130 which leads to the conventional vapor recovery system. The propane vapors from the still G are also exhausted through line 132 to the vapor recovery system which system comprises the precooler 135, compressor 136 and condenser 137. The compressed, condensed liquid propane passes from the condenser 137 through line 138 into the propane storage tank F to be recycled to the system as described hereinbefore.

Instead of operating the electrical dewaxing process in two stages as hereinbefore described, it is sometimes desirable to treat the wax in a single stage and in this case only the primary chiller C and primary electrical treater A are employed. When the process is so operated the liquid propane diluent from the storage tank F after having flowed through the heat interchanger I to cool it below the solution temperature of the wax is bypassed through the pipe 140 and valve 141 to the line 112 leading to the propane scrubbing spray nozzles 59 and 60 in the primary electric treater. This wash propane is then collected in funnel 48 and withdrawn through the line 51 from the primary electric treater and recirculated by means of pump 92 through the line 93, valve 94 and line 91 to mix with the incoming waxy oil feed in chiller C as described in connection with the two-stage process.

The washed deoiled wax from the primary electric treater, instead of being forced by the pump through the valve 96 into the redispersion chamber D, is in the case of the single stage treatment, withdrawn through the valve 143 and line 144, valve 96 being closed.

In either the single stage or two-stage process of electrical dewaxing, the make up propane is, when necessary, supplied for admixture with the wax-bearing oil feed flowing to the primary chiller C from the liquid propane storage tank through lines 99, 146, and bypass valve 145, and through pipes 147 and 91.

In general, the quantity of dewaxed propane recovered from the primary and secondary propane washing stages in the primary and secondary treaters is of sufficient volume to adequately dilute the feed material without additional make up propane from the storage. This feature of utilizing the recovered wash propane for the initial dilution of the feed is particularly advantageous in allowing effective washing of the wax without materially increasing the overall effective propane ratio.

The high potential electric field is maintained between the electrodes in the treaters through suitable electrical connections from the high potential generator 45.

In the operation described, employing propane diluent the treaters operate in atmospheres of propane vapor confined within the treater shells. When other volatile diluents are employed the atmospheres within the treater shells will consist of vapors of such diluents. The process is not limited, however, to the use of volatile diluents, certain substantially non-volatile diluents such as kerosene and gas oil and medium heavy hydrocarbon fractions being frequently employed under some conditions. The character of the gaseous atmosphere maintained within the treater shell, although having some bearing thereupon, is not of primary importance in so far as the electrical ionization effects of the electric treating fields are concerned. It is of course necessary to avoid inflammable gaseous mixtures.

The electrode banks 39, 40, 70 and 71 are constructed of pointed wires which may be approximately 1/16 to 1/8 inch in diameter and approximately 12 inches long and they are supported at their upper ends from the supporting gridwork as described hereinbefore with their axes perpendicular to the upper surface of the belt electrode. These pointed electrodes are preferably spaced from one another at distances of from 1 to 2 inches on centers. The lower pointed ends of the electrodes are uniformly spaced from the upper surface of the belt electrode and adjusted at a distance just sufficient to prevent continuous spark-over therebetween at the operated potentials. Operating potentials which have been found to be effective for efficient dewaxing of the oil are in the neighborhood of 50,000 to 100,000 volts and under these conditions of voltage and electrode spacing a silent electric discharge or corona is observed between the ends of the electrodes and the surface of the belt electrode upon which the wax-bearing oil to be treated is flowed and upon which the deposited wax layer is washed and electrically dried. Under these potentials and under conditions where the silent electric discharge or coronar occurs from pointed electrodes, a phenomenon is associated therewith which manifests itself as an electrical windage blowing from the electrode of small area toward the electrode of relatively large area. Such ionizing conditions are herein referred to as "electrical windage." The electric potential applied to the electrodes by means of the generator 45 is preferably unidirectional and of a constant potential whereby the maximum average potential may be maintained between the electrodes without spark-over. The electrodes 39, 40, 70 and 71 are with treating of the majority of waxes also preferably maintained at the negative polarity.

The process and apparatus is not limited to two stages as illustrated herein but a plurality of such stages may be employed. For example, instead of terminating the process with a secondary electric treater as illustrated, a treater or a series of treater stages of the primary electric treater type as illustrated in Fig. 1 may be employed, the series terminating in the primary or secondary type of electric treater as desired. When such a series of treaters is employed, the solvent supply to each redispersion chamber is derived from the collected wash solvent from each of the following electric treaters in the series. Thus, the wash solvent for each following treater stage becomes the solvent supply for each preceding redispersion chamber. In case the series ends with the primary type of electric treater the solvent is introduced into the system from the storage tank by way of the last washing stage in the last treater, but if the series ends in the secondary type of treater the solvent is introduced into the system by way of the last redispersion chamber in the series as illustrated in the drawings.

The hereinbefore described apparatus and process are not only applicable to the separation of wax from oil, as described by way of illustration, but are applicable to the separation of asphalt resin fats, color bodies, carbonaceous matter and the like precipitatable substances and solid suspensions from oils or liquids in general, it being only necessary to effect a prior precipitation of the substances to be separated after which the electrical treatment is performed by the apparatus in a manner similar to that described in connection with the electrical dewaxing process. Chilling has been described as the specific method for preparing wax-bearing oil to be electrically dewaxed by the described process and apparatus of this invention, but obviously other appropriate preparatory methods would be employed for the separation of other substances, such preparatory methods being dependent upon the character of the materials. For example in the separation of asphaltic constituents from asphalt-bearing oil, as hereinbefore briefly described, the asphalt may be precipitated usually at normal temperatures by the addition of a suitable selective solvent such as liquid propane, or other liquid normally gaseous hydrocarbons, as is now well known in the solvent deasphalting art. After thus effecting the precipitation of asphalt, that portion of the oil which carries finely divided asphalt precipitate in suspension is fed to the electrical treater and electrically separated from the oil in a manner similar to that described in connection with the described dewaxing operations.

Other volatile diluents and wash liquids such as liquid ethane, butane, naphtha and gasoline may be employed in the hereinbefore described processes. Certain non-volatile diluents such as kerosene, gas oil, and even light lubricating oil fractions may be also employed. When non-volatile diluents and wash solvents are employed, the refrigeration steps of the processes may be accomplished by indirect heat exchange with suitable refrigerants through suitable heat interchangers.

The foregoing is merely illustrative of the apparatus and process of the invention and is not intended to be limiting. The invention includes any method and apparatus which accomplishes the same results within the scope of the claims.

I claim:

1. A process for dewaxing oil comprising diluting waxbearing oil with a solvent, precipitating wax in the resultant solution, subjecting the mixture to an electric field, depositing the wax precipitate under the influence of the electric field in a layer upon an electrode surface and withdrawing the thus separated wax-free oil, subjecting the electrically deposited wax layer on said electrode to washing with a quantity of solvent while free from the influence of an electric field, subsequently subjecting the washed wax layer to an electric field and to further solvent wash under the influence of the electric field to remove wash solvent and occluded oil from the wax separately collecting and removing the said wash solvent and occluded oil and removing the thus treated wax from the electrode surface.

2. A process for dewaxing oil comprising applying a mixture of oil containing precipitated wax to an inclined electrode surface whereby the thus applied waxy oil flows downward over the electrode surface in the form of a layer under the influence of gravity, moving said inclined electrode surface upward in a direction countercurrent to said downwardly flowing waxy oil, subjecting said waxy oil layer to an intense electric field, whereby wax is deposited from the oil in the form of a dense coating upon said electrode surface and moves countercurrent to and separates from said oil layer, subjecting said separated wax coating on the upward moving electrode surface to a liquid wash to scrub the said deposited wax coating and to remove included and adhering oil therefrom, removing the scrubbed wax layer from said inclined electrode surface and separately collecting and separately removing the dewaxed oil and the scrubbing liquid wash.

3. A process for separating wax from oil comprising depositing a layer of wax containing oil in a layer upon an electrode surface, subjecting the deposited wax layer on said electrode to washing with a quantity of wash solvent while said layer is substantially free from the influence of an electric field, whereby a portion of said wash solvent is absorbed by said wax layer, subsequently subjecting the thus washed wax layer to further washing with a quantity of wash solvent in the presence of an electric field from an ionizing electrode directed toward said layer and substantially surrounded by a gaseous medium, said electric field being of sufficient intensity to produce an electrical windage impinging upon said washed wax layer to remove occluded wash solvent and oil, withdrawing said removed wash solvent and oil and subsequently removing the thus treated wax layer from said electrode surface.

4. A process according to claim 3 in which the deposited wax layer is subjected to the said ionizing electric field upon an inclined plane surface.

5. A process for dewaxing oil comprising subjecting the wax-bearing oil containing precipitated wax to the influence of an electric field and depositing the wax precipitate in a layer upon an electrode surface, subjecting the deposited wax layer on said electrode to washing with a quantity of wash solvent while said layer is substantially free from the influence of an electric field, whereby a portion of said wash solvent is absorbed by said wax layer, subsequently subjecting the thus washed wax layer to further washing with a quantity of wash solvent in the presence of an electric field from an ionizing electrode directed toward said layer and substantially surrounded by a gaseous medium, said electric field being of sufficient intensity to produce an electrical windage impinging upon said washed wax layer to remove occluded wash solvent and oil, withdrawing said removed wash solvent and oil, and subsequently removing the thus treated wax layer from said electrode surface.

6. A process for dewaxing oil comprising diluting oil with a solvent, precipitating wax in the resultant solution, depositing the wax precipitate from the resultant mixture in a layer upon an electrode surface, and removing it from the major portion of the wax-bearing oil mixture from which it is deposited, subjecting the deposited wax layer on said electrode surface to washing with a quantity of wash solvent, while said layer is substantially free from the influence of an electric field, whereby a portion of said wash solvent is absorbed by said wax layer, subsequently subjecting the thus washed wax layer to the influence of an electric field from an ionizing electrode directed toward said layer and substantially surrounded by a gaseous medium, said electric field being of sufficient intensity to produce an electrical windage impinging upon said washed wax layer to remove occluded wash solvent and oil, withdrawing said removed wash solvent and oil and commingling it with wax-bearing oil, said removed wash solvent thus constituting a portion of the first mentioned solvent, and removing the thus treated wax layer from said electrode surface.

7. A process according to claim 6 in which the said washed wax layer while being subjected to the said electric field is subjected to a further wash with wash solvent.

8. A process for separating wax from oil comprising subjecting a preformed layer of wax deposited upon an electrode surface to washing with a quantity of wash solvent while simultaneously subjecting said wax layer to the influence of an electric field from an ionizing electrode directed toward said layer and substantially surrounded by a gaseous medium, said electric field being of sufficient intensity to produce an electrical windage impinging upon said washed wax layer to remove occluded oil and wash solvent, removing the thus treated wax layer from said electrode surface and redispersing same in a separate body of solvent to form a body of solvent containing precipitated wax, applying the solvent-wax precipitate mixture in a layer to an electrode surface, subjecting said solvent-wax mixture layer to an ionizing electric field to re-deposit the wax in a layer upon the electrode surface, and to separate the said solvent therefrom and separately removing and withdrawing said wax layer and said separated solvent.

9. A process according to claim 8 in which the last mentioned withdrawn solvent is utilized as a portion of the first mentioned wash solvent.

10. A process according to claim 8 in which the said redispersion step comprises redissolving and reprecipitation.

11. A process according to claim 8 in which the said redispersion step comprises mixing without substantial resolution.

12. A process for dewaxing oil comprising applying a mixture of oil containing precipitated wax to an inclined electrode surface whereby the thus applied waxy oil flows downward over the electrode surface in the form of a layer under the influence of gravity, moving said inclined electrode surface upward in a direction countercurrent to said downwardly flowing waxy oil, subjecting said waxy oil layer to an intense electric field, whereby wax is deposited from the oil in the form of a dense coating upon said electrode surface and moves countercurrent to and separates from said oil layer, subjecting said separated wax coating on the moving electrode surface to a liquid wash to scrub the said deposited wax coating and to remove included and adhering oil therefrom, subjecting the thus washed wax layer to an ionizing electric field to remove additional included oil and wash liquid therefrom, removing the scrubbed wax layer from said electrode surface and separately collecting and separately removing the dewaxed oil, and the scrubbing liquid wash.

13. A process for removing wax from suspension in oil comprising subjecting a body of oil containing wax in suspension to the influence of an electric field and thereby depositing the wax in a layer upon an electrode surface, removing the deposited wax from the major portion of the oil from which it was deposited, subjecting the deposited wax layer on a depositing electrode surface to washing with a quantity of wash solvent applied in the presence of an ionizing electric field between said depositing electrode and an ionizing electrode substantially surrounded by a gaseous medium and which is directed toward the surface of said depositing electrode, said field being of sufficient intensity to produce an electrical windage impinging upon said wax layer whereby occluded oil is removed from said wax layer, and removing the major portion of the dewaxed oil from which the wax deposited and the said wash solvent in separate streams.

14. Apparatus for dewaxing oil comprising an electrode having an inclined surface, another electrode adjacent said inclined surface, means to maintain a high electric potential difference between said electrodes, means to place wax-bearing oil in a layer upon said inclined electrode surface whereby it is subjected to the electric field between said electrodes and wax is deposited upon said inclined electrode surface, means to move said inclined electrode surface whereby wax deposited thereon is carried through said electric field, means to wash the deposited wax coating moving through said electric field with a liquid, means to remove the thus washed deposited wax from the surface of said inclined electrode and means to separately collect and separately remove the dewaxed oil and the wash liquid.

15. Apparatus for dewaxing oil comprising an endless belt electrode, a plurality of rotatable rollers supporting said belt electrode whereby said belt electrode surface forms a plurality of non-coincident planes, means adjacent said electrode to form an intense electric field, means to place wax-bearing oil upon certain of said belt electrode surface planes in layer form whereby wax is deposited upon the belt surface in the form of a compact coating under the influence of said electric field, means to move said belt electrode whereby the deposited wax coating is transported from one non-coincident plane to another and means to subject the deposited wax coating to a washing action on certain other of said non-coincident planes whereby oil thus freed of wax and wash liquid can be separately collected.

16. Apparatus for dewaxing oil comprising an endless belt electrode, a plurality of rotatable rollers supporting said belt electrode whereby said belt electrode surface forms a plurality of non-coincident planes, means adjacent said electrode to form an intense electric field, means to place wax-bearing oil upon certain of said belt electrode surface planes in layer form whereby wax is deposited upon the belt surface in the form of a compact coating under the influence of said electric field, means to move said belt electrode whereby the deposited wax coating is transported from one non-coincident plane to another and means to subject the deposited wax coating to a washing action on certain other of said non-coincident planes, and means to separately collect and remove wax, dewaxed oil and wash liquid.

17. Apparatus for dewaxing oil comprising an endless metallic belt electrode, a plurality of rotatable rollers supporting said belt electrode whereby said belt electrode surface forms a plurality of non-continuous planes, a plurality of pointed electrodes adjacent certain of said belt electrode planes to form intense electric fields, means to place wax-bearing oil upon certain of said belt electrode surface planes in layer form whereby wax is deposited upon the belt surface in the form of a compact coating under the influence of said electric fields, means to move said belt electrode whereby the deposited coating is transported from one non-continuous plane to another and means to subject the deposited wax coating to a washing action on certain other of said non-continuous planes whereby oil thus freed of wax and wash liquid can be separately collected.

LYLE DILLON.